US006549770B1

(12) United States Patent
Marran

(10) Patent No.: US 6,549,770 B1
(45) Date of Patent: Apr. 15, 2003

(54) OVER THE AIR PROGRAMMING AND/OR SERVICE ACTIVATION

(75) Inventor: Nadine Marran, Califon, NJ (US)

(73) Assignee: Cellco Partnership, Bedminster, NJ (US)

( * ) Notice: Subject to any disclaimer, the term of this patent is extended or adjusted under 35 U.S.C. 154(b) by 0 days.

(21) Appl. No.: 09/578,456

(22) Filed: May 26, 2000

(51) Int. Cl.[7] .................................................. H04M 3/00
(52) U.S. Cl. ........................................ 455/419; 455/418
(58) Field of Search ................................. 455/414, 418, 455/419, 420

(56) References Cited

U.S. PATENT DOCUMENTS

| | | |
|---|---|---|
| 5,109,403 A | 4/1992 | Sutphin |
| 5,454,024 A | 9/1995 | Lebowitz |
| 5,465,401 A | 11/1995 | Thompson |
| 5,524,135 A | 6/1996 | Mizikovski et al. |
| 5,533,029 A | 7/1996 | Gardner |
| 5,544,222 A | 8/1996 | Robinson et al. |
| 5,594,779 A | 1/1997 | Goodman |
| 5,603,084 A | 2/1997 | Henrey, Jr. et al. |
| 5,684,799 A | 11/1997 | Bigham et al. |
| 5,689,825 A | 11/1997 | Averbuch et al. |
| 5,722,084 A | 2/1998 | Chakrin et al. |
| 5,726,984 A | 3/1998 | Kubler et al. |
| 5,729,536 A | 3/1998 | Doshi et al. |
| 5,729,549 A | 3/1998 | Kostreski et al. |
| 5,732,074 A | 3/1998 | Spaur et al. |
| 5,794,142 A | 8/1998 | Vanttila et al. |

Primary Examiner—Vivian Chin
Assistant Examiner—Tu X Nguyen
(74) Attorney, Agent, or Firm—McDermott, Will & Emery

(57) ABSTRACT

The invention relates to new techniques for managing wireless digital communications subscribers' mobile, digital devices, such as digital cellular telephones. A wireless digital communications network having the capability to download programming data over-the-air directly to a subscriber's mobile, digital device communicates with an intelligent system that processes complex inputs, discovers problems from the complex inputs, and formulates individualized solutions for discovered problems. The intelligent system also searches the wireless digital communications network for, and retrieves, the necessary data for solving discovered problems; triggers the wireless digital communications network to establish a data link with a subscriber's mobile, digital device; and then directly downloads the necessary data to the subscriber's mobile, digital device over-the-air.

33 Claims, 3 Drawing Sheets

OVER THE AIR PROGRAMMING AND/OR SERVICE ACTIVATION

FIELD OF THE INVENTION

The concepts involved in the present invention relate to a new approach for management of subscribers' mobile, digital devices, such as digital cellular telephones, through over-the-air downloads of data contained within such devices.

BACKGROUND

Mobile digital communication is becoming increasingly popular, particularly for voice-grade telephone services, and more recently for data communication services. As a result, there is an increasing demand for development of mobile, digital devices with ever more sophisticated features. As digital devices become more complex, managing subscribers' mobile, digital devices is likewise becoming more complex, resulting in system administrator errors and inefficient use of digital communication network resources.

At present, manufacturers build wireless, mobile digital devices with a complete set of hardware and read-only software to support a full set of desired features. Some capability exists today to download service-related information over-the-air to existing digital cellular telephones ("digital telephones" or "telephones"). However, this capability has been limited to data needed to provision a new unit or to provision an existing unit for a new service. During initial provisioning, for example, the carrier loads into the memory of the telephone necessary parameter data that relates to characteristics of a digital telephone, i.e., something that affects how the digital telephone operates such as the mobile identification number (MIN) assigned to the unit. Essentially, these programming techniques turn on or off available features by setting bits to toggle features on/off or by loading necessary parameter data that relates to characteristics of a digital telephone. However, the desired feature functionality, other than the necessary parameter data that relates to characteristics of a digital telephone, such as the MIN, is present in the unit as manufactured and sold to the user.

Mobile device programming is typically a manual process. Some drawbacks to manual programming are the time and resources required, and the opportunity for error. Because of limited resources, this process is limited to minimal programming of required parameters. Additional parameters, such as Preferred Roaming Lists (PRLs), may be pre-programmed into the device by the manufacturer. Since many parameters are network specific, custom pre-programming requires a special arrangement between the carrier and manufacturer.

After the initial programming of a subscriber's digital device, parameter updates may be required. If the customer requests a new Mobile Telephone Number or area codes are reassigned in a service area, the subscriber device must be reprogrammed. There are other occasions when parameter updates are desired to enhance digital device performance or network efficiency. An example is the Preferred Roaming List, which may change as the result of a merger between wireless service providers, or through the creation and termination of service contracts between wireless service providers, etc.

Because of the limited actions that can currently be taken, there should not be a lot of complexity in maintaining parameter data that relates to characteristics of a digital telephone in existing digital telephones. Actions are limited because updates to MINs are infrequently needed, and preferred roaming list updates are simply run as batch jobs to update as many digital cellular telephones as possible with an entirely new master PRL for the local in which subscribers reside. Toggling features on or off is only performed by a carrier in response to subscriber requests to do so, further limiting the actions a carrier needs to initiate.

However, as simple as current parameter data that relates to characteristics of a digital telephone maintenance appears, it is inefficient and provides multiple opportunities for operators to introduce error, particularly when applied to increasingly large numbers of mobile digital devices. As one example, consider the problems that arise primarily relating to PRL updates.

Preferred roaming lists are programmed into subscribers' digital devices, either by the manufacturer or by the carrier. A PRL enables each digital device to select preferred wireless communication service providers to use when a subscriber is outside of the carrier's wireless communication network. Preferred roaming lists essentially contain system identifications (SIDs) for each wireless communication service provider that the carrier has arrangements with to provide the lowest rates when the carrier's subscribers are using their digital devices outside of the carrier's network. Through mergers, the creation and termination of contracts, and other business procedures, a carrier's relationships with other wireless communication service providers is going to change. As a result of changing business relationships, PRLs change. Optimally, a carrier is able to program the latest version of the PRL into new subscribers' digital devices, and is able to update existing subscribers' digital devices with the latest version of the PRL as well. This allows the carrier to be charged the lowest rates when its subscribers are roaming outside of the carrier's network.

After a carrier updates its master preferred roaming list with new SIDs, the carrier would like its subscribers' mobile, digital devices to contain the updated PRL. Currently, PRLs are updated by sending a copy of the entire master PRL to all subscribers' digital telephones.

In a typical batch processing routine, an operator creates a list of digital telephones from a pool of digital telephones that do not contain the most recent PRL. The carrier's equipment then attempts to contact the predefined list of digital devices each day, typically during an off-peak time period, i.e., very late at night or early in the morning when traffic volume is low. However, any listed digital devices that are off-line during the off-peak interval can't receive the new list. Typically, they are skipped and put back into the pool of digital telephones that need to be updated.

This is an inefficient use of the carrier's network resources because of the volume of information that is sent. It also takes up a lot of memory on each subscribers' digital telephone, and may cause digital cellular telephones to be slow when searching for a preferred communications provider while the subscriber is roaming. There are also opportunities for operator errors because operators must identify the various types of digital cellular telephones that the carrier's subscribers have, and send appropriate copies of the updated master PRL according to the make and model of digital cellular telephones used on the network. Not only is it possible for operators to misidentify which version of a master PRL should be sent to which digital telephones, but operators may simply forget to update any number of digital telephones.

Costs of development of new models of digital devices, with ever more sophisticated features, are high and continue to spiral upward. At the same time, driven by a long decline in consumer electronic prices, the price that the market will bear for such telephones has remained steady or even declined, in spite of the high demand. New digital devices with basic functionality encoded by the manufacturer and large amounts of available memory, so users may select various features and download software for those features to the unit, have been proposed. An example is commonly-assigned co-pending provisional application 60/185,131, entitled *OVER-THE-AIR PROGRAMMING OF WIRELESS TERMINAL FEATURES*, incorporated herein by reference.

Along with more complex digital devices comes more complex management of those devices by the carrier. Although subscribers will initiate provisioning of features, the carrier will now have to manage more complex parameter data that relates to characteristics of a digital telephone on subscribers' digital telephones along with existing parameter data that relates to characteristics of a digital telephone, such as PRLs and MINs. This means that carriers will have more diverse parameter data relating to characteristics of digital devices to send to subscribers' digital devices and differing needs for sending different parameter data relating to different characteristics of digital devices to individual digital devices. The carrier simply cannot afford to utilize the current, inefficient brute force method of making comprehensive, systematic downloads to maintain subscriber's digital devices.

Mobile provisioning has also become more complex in recent years, as nation-wide service plans, short messaging and even Internet access become more common mobile service offerings. There are also a growing variety of mobile subscriber devices, from smart phones and wireless PDAs to low-end modules used for telemetry. Finally, increased competition is driving carriers to both reduce operating costs and improve customer satisfaction. All of these factors are creating a great opportunity for the automation of handset management processes.

There are existing standards defined for Over-The-Air Service Provisioning (OTASP) and Over-The-Air Parameter Administration (OTAPA). IS-725-A defines the message structures and commands for OTASP and OTAPA capabilities. IS-683 is the air interface standard for OTASP and OTAPA in Code Division Multiple Access (CDMA) systems. IS-683A Over-The-Air (OTA) operations occur between a mobile digital device and an Over-The-Air Function (OTAF) using IS-95A traffic channel data burst messages. This technology has been available for years, but the implementation to date has been limited.

These standards for OTA are centered on voice service programming and are not flexible enough to accommodate the full range of carrier needs. The standards do not address programming of parameter data that relates to characteristics of a digital telephone at this time. Each new feature or enhancement will require development for the network infrastructure, the mobile device, and OTAF. Use of the messaging channel as a transport does provide the ability to download parameter data that relates to characteristics of a digital telephone during a voice call. However, the simultaneous voice session may be desirable at times, but it is an added complication for carriers looking to fully automate the OTASP and OTAPA processes. Downloading parameter data that relates to characteristics of a digital telephone during a voice call limits when a carrier can download data and also limits data throughput during the OTA session. In order to support future applications, such as OTA Software Download (OTASD), more bandwidth is required. The long-term drawbacks of the IS-725-A and IS-683 standards have led CDMA service providers to seek alternative solutions.

Accordingly, there is a need for a carrier to be able to download parameter data that relates to characteristics of a digital telephone to a subscriber's mobile, digital device when no voice call has been initiated by the subscriber, and to reduce the amount of parameter data that relates to characteristics of a digital telephone sent over-the-air to each subscriber's digital device. There is also a need to ensure that individual digital devices receive parameter data that relates to characteristics of a digital telephone in a timely manner. Any download solutions for parameter data that relates to characteristics of a digital telephone should be readily scalable, to enable easy expansion to encompass future needs for software downloading.

SUMMARY OF THE INVENTION

The present invention alleviates the above noted problems relating to managing subscribers' mobile, digital devices by downloading programming data to the devices intelligently, automatically, and on a device-by-device basis. The present invention further manages subscribers' mobile digital devices by downloading programming data, which includes new data, software in the form of executable code, as well as updates to existing data, to each mobile digital device on an as needed basis. Downloads are made over-the-air with data that each mobile digital device needs in order to operate in the best and most efficient manner. Individualized downloads for each mobile digital device are accomplished by utilizing a wireless digital communications network having over-the-air data transmission capabilities and endowed with an expert system. The digital wireless communications network gathers and compiles information about subscribers' mobile digital devices by collecting network administration data from within the network and from each mobile digital device. The expert system connected to the network analyzes the compiled complex network administration data and decides whether an individual mobile digital device requires a change to its data. The expert system retrieves only the necessary data needed to provision or update an individual mobile digital device. The expert system then triggers an OTA server to initiate a data communication session with the individual mobile digital device, and downloads only the necessary data onto the individual mobile digital device. Wireless digital communication networks with over-the-air capabilities and expert systems are described below.

More specifically, a wireless digital network compiles network administration data relating to mobile digital device administration directly from individual mobile digital devices and/or from various processing nodes within the network itself, e.g. from switches, location registers, a mobile telephone authorizing system, or a provisioning or billing system. Network administration data may contain information about a subscriber's peak usage; where a subscriber roams and how often; SIDs on a digital device's PRL; instances of the digital device dropping calls or other indicia of software problems with the device; etc. This complex network administration data is compiled, then configured for input into an expert system, and may be transmitted in its entirety or filtered to remove irrelevant information. The expert system then analyzes the complex network administration data by using programmed logic to apply a set of rules to the data. Consequently, a decision is made by the expert system whether a mobile digital device requires provisioning, parameter administration, repairs, etc. For example, provisioning, parameter administration, and/or repairs would be required if a subscriber's mobile digital device was identified as having faulty software; or needed new SIDs for the subscriber's PRL based upon that subscriber's roaming usage of their mobile digital device and the current contracts that the carrier maintains with other wireless digital communication service providers. If the expert system decides that a particular mobile digital device requires provisioning, parameter administration, repairs, etc., then a programming action is triggered that will identify what data the mobile digital device needs, retrieve the specific data from the network, and initiate an over-the-air session to download the programming data onto the subscriber's mobile digital device. The download to a subscriber's mobile, digital device can also include data that is ready for downloading received by the expert system, e.g., software that the subscriber has requested.

A particularly beneficial aspect of the present invention is enabling a wireless digital communications network having over-the-air capabilities to intelligently manage subscribers' mobile digital devices. The expert system actively searches for events contained in complex network administration data, and takes appropriate action on recognized events to automate and improve management of each subscriber's particular mobile digital device. A recognized event may be a subscriber roaming into a new territory, an area code split, suboptimal call performances, a provisioning request, etc., i.e., an event defined for the expert system as an event that requires the expert system to make a decision and/or initiate a programming action regarding the event.

Use of an expert system to maintain subscribers' mobile digital devices reduces operator errors through systematic application of rules to complex network administration data. An expert system is more efficient because provisioning, parameter administration, repairs, etc. are performed only when needed, only for mobile digital devices that need the provisioning, parameter administration, repairs, etc., and are reduced in the amount of data that needs to be downloaded onto each mobile digital device. Reducing the amount of data downloaded thereby frees network resources and uses less memory on mobile digital devices. An expert system is better able to keep pace with current changes by constantly searching for recognized events and by deciding what particular mobile digital devices require provisioning, parameter administration, repairs, etc., and when such event should be scheduled. Also, the inventive approach provides more individualized and complete maintenance of subscribers' mobile, digital devices.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PRESENTLY PREFERRED EMBODIMENT

The present invention combines over-the-air programming functionality of a wireless digital communications network with the ability of an expert system to receive complex network administration data and formulate an individualized programming action based upon the complex network administration data.

Figure 1:
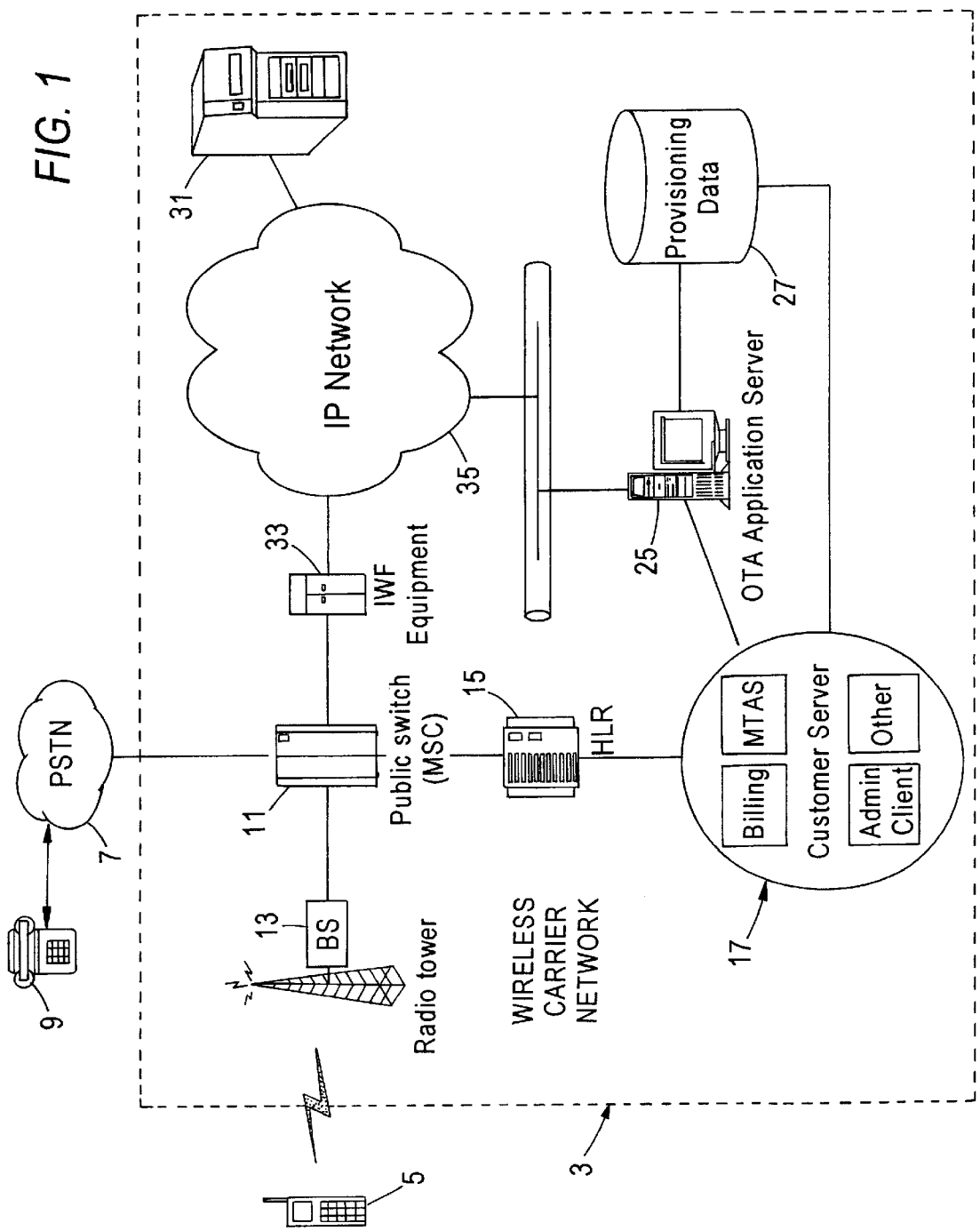
FIG. 1 is a schematic diagram of a wireless digital communication network configured with an over-the-air (OTA) server and running an expert system in accord with the present invention.

FIG. 1 depicts a wireless communications network 3 providing voice telephone communications, data communication, over-the-air capabilities, and decision making capabilities. FIG. 1 is given as an example of a preferred arrangement for the present invention, however the inventive subscriber device management system may be used with other configurations for wireless networks. The wireless communications network 3 provides cellular or personal communications service (PCS) type services to mobile digital devices depicted by way of example as digital telephone 5. The network 3 enables users of the digital telephones 5 to initiate and receive telephone calls to each other as well as through the public switched telephone network (PSTN) 7 to landline telephones 9.

The network 3 includes a number of mobile switching centers (MSCs) 11, only one of which appears in the drawing for simplicity of illustration. Each MSC 11 connects through trunk circuits to a number of base stations 13, which the MSC controls. Through the MSC 11 and the base stations 13, the network 3 provides voice-grade digital telephone services over the common air interface to and from the digital telephones 5. The network elements also provide data services over the logical communication channels, as discussed later.

The digital telephones 5, the MSCs 11 and the base stations 13 implement one or more standard air-link interfaces. For example, the wireless telephone network 3 may support dual-mode services. Although not shown separately, such a dual-mode network includes wireless telephone components that output analog telephone signals for transmission according to an analog wireless protocol (e.g., AMPS) as well as digital wireless system components that operate in accord with a digital wireless protocol, for example the CDMA protocol IS-99. The base stations may provide both types of services. Alternatively, the network may comprise base stations that send and receive voice and signaling traffic according to the prescribed analog protocol as well as digital base stations that utilize the digital wireless protocol. Each dual-mode MSC typically includes a switching subsystem for analog telephone services, a switching subsystem for digital telephone services, and a control subsystem. Other MSCs may implement only one type of service.

Digital wireless equipment is available today to support any one of several common interface standards, including time division multiple access (TDMA) and the Global System for Mobile communications (GSM). In the preferred embodiment, the digital wireless telephone components support the code division multiple access (CDMA) standards.

With CDMA, each transmitted signal comprises a different pseudorandom binary sequence, also referred to as a pseudonoise (PN) sequence, which modulates a carrier signal and spreads the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations 13 or the subscribers' digital telephones 5 by using a correlator which accepts only signal energy from the selected binary PN sequence and despreads its spectrum. The CDMA signals from other sources, whose codes do not match the selected binary PN sequence, are not despread in bandwidth and, as a result, contribute only to the background noise representing a self-interference generated by the system.

As will be familiar to those of ordinary skill, an air-link interface for each cellular service in a geographic area includes paging channels and/or signaling channels, as well as actual communications channels for voice and/or data services. The channels may be separate frequency channels, or the channels may be logically separated, for example based on time division or code division. The paging and signaling channels are used for preliminary coded communications between a cellular telephone and a cell site in setting up a telephone call or other session, after which a communication channel is assigned or set up for the telephone's use on that call.

The wireless network 3 includes a home location register (HLR) 15 that stores subscriber profiles for each of the wireless subscribers and their associated digital wireless telephones 5. The HLR 15 may reside in the home MSC 11 or in a centralized service control point that communicates with the MSC(s) 11 via an out-of-band signaling system such as an SS7 network. As recognized in the art, the HLR 15 stores for each mobile subscriber certain network administration data such as the subscriber's mobile telephone number, the mobile identification number, and information specifying the wireless services subscribed to by the mobile subscriber, such as numeric paging or text-based paging, data communication services, etc. Briefly, network administration data comprises data that reflects the characteristics of a digital telephone and its associated network services, such as executable code residing on a digital telephone, data relating to usage of a digital telephone, data relating to billing and other costs for a digital telephone, data relating to services available for digital telephones, and any other data that is useful for maintaining services and proper operation for a digital telephone. The HLR 15 generates other network administration data as it is accessed, to facilitate registrations and control subscriber services. Other network administration data, i.e., subscribers' usage of their digital devices and roaming information for example, can be received from the MSCs 11. Network administration data may be compiled within processing nodes such as the MSCs 11 and the HLR 15, or by a separate system (not shown) residing within the digital communications network, for example, within the customer service center 17 or the private internet protocol network 35.

Some network administration data is generated directly by subscribers' digital telephones. For example, errors or other problems with the data and/or programming on a subscriber's telephone are detected by the subscriber who then calls the carrier to give notification of the problem. Network administration data generated by subscribers' digital telephones may also be compiled within processing nodes such as the MSCs 11 and the HLR 15, or by a separate system (not shown) residing within the digital communications network, for example, within the customer service center 17 or the private internet protocol network 35.

Other data that is ready to be downloaded onto a subscriber's mobile, digital device can be compiled along with network administration data. For example, a software update for a particular type and brand of mobile, digital device would need to be downloaded onto subscribers' mobile, digital devices and could be included with compiled network administration data.

The carrier also operates a number of different processing nodes in one or more customer service centers 17. These include one or more billing systems, network provisioning systems such as the Mobile Telephone Administration system (MTAS), client account administration systems, and the like. The billing system, for example, receives network administration data such as usage and operations data from the MSCs 11 and processes that data to generate bills for individual customers. The billing system also forwards data regarding users roaming through the carrier's service area through a clearinghouse (not shown) for reconciliation with other wireless communication service providers. The MTAS provides data to the HLR 15 and/or to the MSCs 11 to provision services for new stations 15 and modifies provisioning data as customers change their subscriptions to obtain different sets of services from the carrier. Network administration data from these processing nodes may also be compiled within the processing nodes, or by a separate system (not shown) residing within the digital communications network, for example, within the private internet protocol network 35.

As part of maintaining digital telephones 5, it is necessary to download programming data, including parameter data relating to certain characteristics, or other software, into the digital telephone 5. To automate this procedure, the carrier operates an over-the-air (OTA) provisioning server 25, a provisioning database 27, and an expert system 31, described in greater detail below. The IWF equipment 33 and the IP network 35 provide data communications to the OTA application server 25 and the expert system 31.

The OTA application server 25 is accessible to the expert system 31. The expert system 31 may be a program run on the OTA Application Server 25, or it may consist of a separate computer in communication with the server 25, for example via the private internet protocol network 35.

The expert system 31 receives compiled network administration data from multiple processing nodes of the carrier's network, e.g., the MSCs 11, the HLR 15, and various systems within the customer service center 17, such as the MTAS and billing system. The expert system also accesses a data table of all digital telephones 5 served through the network 3 and the services currently provided to each digital telephone 5 through provisioning data 27.

In order for the digital communications network to automatically push downloads to subscribers' digital telephones, the network needs decisional making capabilities. Detecting when a subscriber's digital telephone 5 needs to be updated and deciding what action to take is preferentially performed by the expert system 31.

An expert system is a sophisticated computer system designed to receive complex inputs and formulate decisions based upon those complex inputs. The computer system can be composed of software, hardware, or can be a combination of software and hardware.

An expert system may consist of three parts: 1. A set of rules generally developed by human "experts" in the subject area the expert system will analyze; 2. A set of particular facts; and 3. A logical engine that reaches all of the conclusions that can be drawn from the facts based upon the rules.

The simplest expert systems assume that their rules and facts tell them everything there is to know. Most complex expert systems check each fact, for example as it is fed into a database, to see if the fact contradicts any of the facts or deductions already in the system, and updates the rules and/or facts accordingly to maintain one consistent set of beliefs.

In the present invention, a preferred expert system 31 combines a working memory with logic programming and a set of predetermined rules for triggering different programming actions. Initial rules in the expert system 31 are defined by experts in the field of managing subscribers' digital telephones 5, and are created to instruct the expert system 31 to take certain programming actions in response to identified activities that the expert system is programmed to recognize. The rules of the expert system may be updated at any time by a carrier as new requirements arise.

In the more advanced implementations of cellular networks, such as the network 3, the carrier provides data communication services in addition to voice-grade telephone services. For example, the network 3 may include interworking function (IWF) equipment 33. This equipment provides a multi-call interface to communication links from the MSC 11 and typically implements a firewall function. In this manner, the IWF equipment 33 essentially looks like a dial-up interface to a data network such the private packet-switched network, the IP network 35, operated by the carrier.

The user essentially makes a data call from the digital telephone 5 to the IWF equipment 33. The IWF equipment 33 answers the call and executes a handshake and log-in routine to validate the digital telephone 5 and in some cases to validate the individual user. The IWF equipment 33 temporarily assigns an Internet Protocol (IP) address to the handset for the duration of the data communication. The equipment then provides a two-way data interface, with appropriate protocol conversions, enabling data access, for example to an OTA Application Server 25.

The hardware of a server system, such as the server 25, corresponds to that of a typical general-purpose computer, comprising a central processing unit (CPU) formed of one or more microprocessors, a number of memory devices and an interface to the data communication network, in this case to the IP network 35. Such a computer may also provide a graphical user interface (GUI) for local operation and control, for example comprising a common type of display, a keyboard and one or more of the common types of cursor controls. Various media, readable by such a system, may store or carry the executable code and any associated data, for carrying out the commands relating to maintaining subscribers' digital devices by the expert system 31 or for the provisioning and feature module downloading performed by the OTA application server 25. Examples of such media include semiconductor and disk type memories, digital tapes, and the like. Computer readable media used by such systems also include various types of signals sent and received by computer systems for loading software code and associated data into the memory and/or the CPU of the system hardware and sending and receiving parameter data that relates to characteristics of a digital telephone and/or network administration data via the IP network 35, the MSC 11, the base station 13 and the air-link.

When the user first obtains a new digital telephone 5, the user operates the digital telephone 5 to call the customer service center 17 to initiate provisioning. The MTAS provides provisioning data to the network elements. The customer service systems 17 also set-up an entry for the digital telephone 5 in the database 27. Once the account is set up, the user initiates a data communication with the OTA application server 25, and the server downloads programming data such as the mobile identification number to provision service in the digital telephone 5, itself. A more detailed description of the over-the-air provisioning operations appears in commonly assigned U.S. patent application Ser. No. 09/123,454, filed on Jul. 28, 1998, by Hsu et al., entitled *DIGITAL WIRELESS TELEPHONE SYSTEM FOR DOWNLOADING SOFTWARE TO A DIGITAL TELEPHONE USING WIRELESS DATA LINK PROTOCOL.*

The IWF equipment 33 also initiates dial-out type procedures in response to commands initiated by the expert system 31 to download programming data from the OTA Application Server 25 through the network 3 to the particular digital telephone 5. In particular, parameter data, i.e., data related to the characteristics of a digital telephone 5 such as the MIN, PRL, the digital telephone's telephone number, etc., can be downloaded over-the-air to a particular digital telephone 5.

Figure 2:
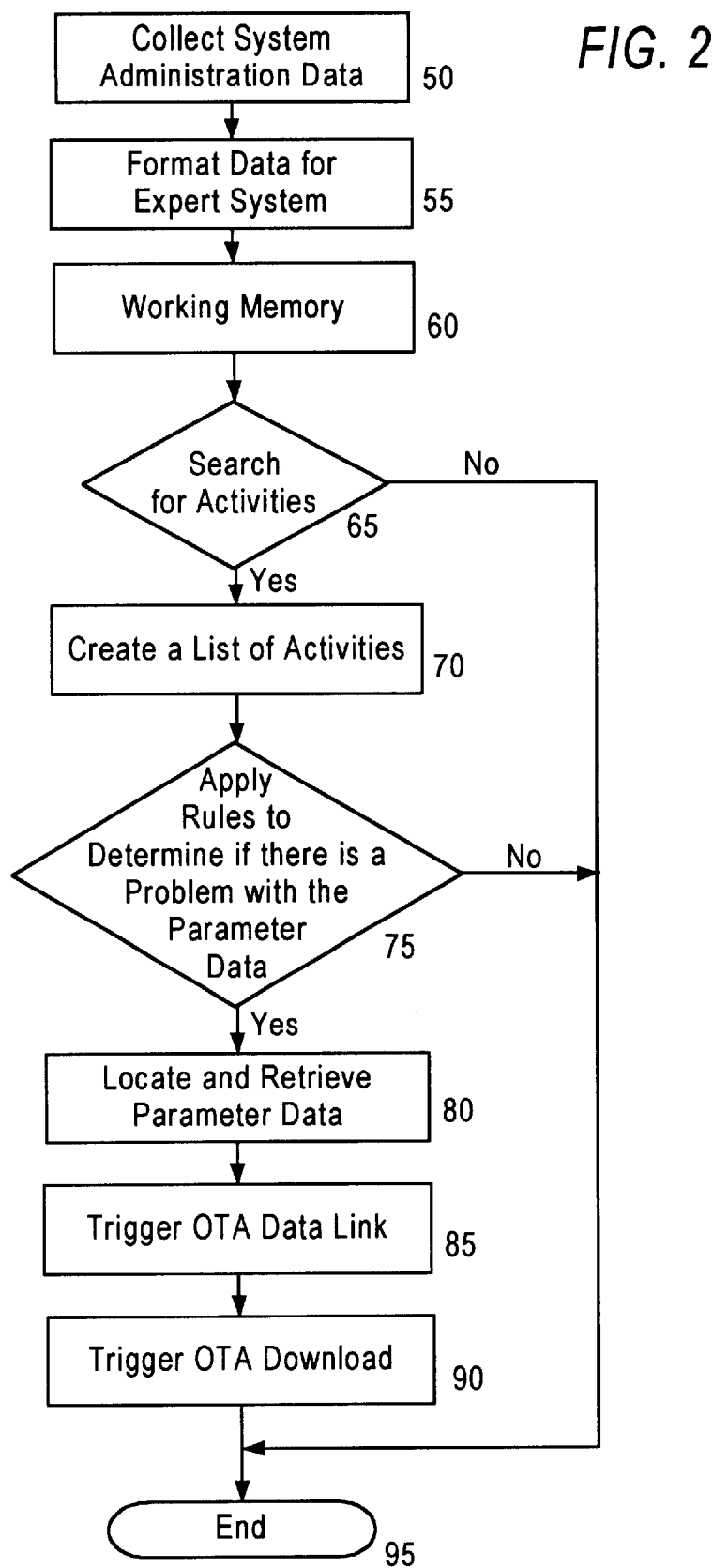
FIG. 2 is a flow diagram of processing performed by an expert system useful in explaining the interaction of an expert system and a wireless digital communications network with OTA functionality in accord with the present invention.

A preferred expert system for the present invention is described making reference to FIG. 2. The illustrated example relates to an application of the inventive concepts to parameter administration. The expert system functions by receiving or collecting compiled complex administrative data from step 50. Complex administrative data may be compiled, for example, by processing nodes or a system designed to compile administration data from a plurality of processing nodes. Examples of processing nodes include the MSCs, HLRs, billing systems, and MTAS. The compiled data is formatted in step 55, then received into the working memory of the expert system, in step 60, to create a log of the complex network administration data. Network administration data originates from individual digital cellular telephones and from various processing nodes within the wireless digital network as described above. When the network administration data is formatted, from step 55, it may be filtered to remove irrelevant data, or it may be sent in its entirety. For example, data pertaining to telephone numbers called by a subscriber might be filtered out if the expert system is not programmed to do anything with called telephone number data.

The expert system then searches the complex network administration data from the working memory, in step 65, for recognized activities. Recognized activities, such as a new MIN request, a subscriber roaming into a new territory, or data that is ready to be downloaded onto a subscribers telephone, are recorded, in step 70, then processed by the expert system, in step 75. Processing in step 75 utilizes logic programming to apply a set of predetermined rules to each recognized activity. Rules are predetermined by human "experts" in the field of subscriber digital device maintenance, and dictate what programming action the expert system will take for each recognized activity, and whether a recognized activity reveals a problem with the parameter data that relates to characteristics of a digital telephone or a need for new and/or updated parameter data on a digital device. The result of applying the predetermined rules to an activity, in step 75, is a determination by the expert system whether a subscriber's digital telephone, associated with the recognized activity, has any problems with its parameter data that relates to characteristics of a digital telephone, and/or needs new and/or updated parameter data.

If the expert system determines that there is no problem with the parameter data that relates to characteristics of a digital telephone on the subscriber's digital telephone, no need for new and/or updated parameter data, or no data that is ready to be downloaded onto a subscriber's telephone, then there is no programming action for the expert system to initiate and nothing may occur, step 95. On the other hand, if the expert system determines that there is a problem with a subscriber's digital telephone's existing parameter data that relates to characteristics of a digital telephone, or there is a need for new and/or updated parameter data, then the expert system needs to initiate a programming action through the wireless digital communications network.

A programming action initiated by the expert system comprises two stages. First, the expert system, in step 80, triggers a search and retrieval, for example a query from the systems in the network such as the billing system or the provisioning system, etc. The search and retrieval initiated in step 80 locates the parameter data that relates to characteristics of a digital telephone needed to either resolve a problem on the subscriber's digital telephone, or to add new and/or update the parameter data that relates to characteristics of a digital telephone on the subscriber's digital telephone, and makes that data accessible to the expert system. For example, if a subscriber's PRL is out of date, the search initiated in step 80 sorts through several categories of information such as billing data, provisioning data, roaming data, usage data, etc., to locate the category containing data necessary to resolve the problem, i.e., the roaming data would be selected. After selecting a category of data, the search initiated in step 80 sorts through that category to find the specific data that will resolve the problem, i.e., several SIDs would be selected and retrieved. Another example is administrative data that is ready to be downloaded onto a subscriber's telephone. For this example, the expert system recognizes that the data is ready to be downloaded and does not initiate a data search. Once the proper parameter data that relates to the proper characteristics of the digital telephone has been recognized or retrieved, the expert system triggers the OTA server, in step 85, to initiate a two-way data link through the IWF equipment 33, the MSC 11, a base station 13, and thus over-the-air with the subscriber's digital telephone. Triggering the OTA server may occur immediately after the proper parameter data that relates to characteristics of a digital telephone has been retrieved, or may be delayed to a time when the expert system has determined that the subscriber is not likely to be using her digital telephone. Whether to trigger immediately or whether to wait depends upon the rules governing the expert system's actions.

When the expert system is ready to trigger the OTA server, a two-way data link is established between the network and a subscriber's digital telephone. A two-way data link may be established in various manners, the following preferred manner is given as an example.

The carrier operates a CDMA wireless communications network that is IS-99 data-services capable. IS-99 defines asynchronous data over a circuit switched connection and allows a digital telephone to provide the same services as a land line dial-up telephone modem.

Along with an IS-99 data-services capable network, an important component is a Wireless Application Protocol (WAP). WAP is an open wireless protocol specification based on Internet standards such as XML and Internet Protocol (IP). The WAP programming model is similar to the world wide web programming model and provides several benefits to application develops, including a familiar programming model, a proven architecture, and the ability to leverage existing tools, e.g., Web servers, XML tools, etc. A micro-browser in the mobile digital device provides the user interface and is analogous to a standard web browser.

Referencing FIG. 1, the OTA Application Server 25, which has an interface with the carrier's Mobile Terminal Authorizing System (MTAS) and billing system in order to synchronize to the information in the MTAS and account records, originates a data call. The data call is routed through the IWF Equipment 33 to a digital telephone 5 via the MSC 11. A Point-to-Point Protocol (PPP) connection is established between the IWF Equipment 33 and the digital telephone 5. PPP is a protocol that allows a computer to connect to the internet through a modem and have most of the benefits of a direct connection to the internet. In this case the carrier's IP Network 35 is actually connecting to a subscriber's digital telephone 5, but the PPP connection serves the same purpose. The IWF Equipment 33 then connects a WAP gateway (not shown, but residing within the IWF Equipment 33) to the subscriber's digital telephone 5 and an IP connection is established between the gateway and the digital telephone 5.

After a two-way data link has been established, the expert system, referencing FIG. 2, triggers the OTA server, in step 90, to download the proper programming data that relates to characteristics of a digital telephone onto the subscriber's digital telephone 5. Preferably, a browser attached to the wireless communications network cases the digital telephone 5 to request a specific URL from the digital telephone 5. The gateway satisfies the request by forwarding the URL assigned to the digital telephone 5 to the server 25. The server 25 then provides the requisite parameter data that relates to characteristics of a digital telephone. When the browser in the telephone 5 receives the requested data, it extracts the data for loading into the memory on the digital telephone 5. The expert system waits to receive a signal from the digital telephone that the parameter data that relates to characteristics of a digital telephone was successfully downloaded, then terminates processing related to the recognized activity, step 95.

In addition to parameter administration, the inventive methodology is useful in other subscriber base management applications. Such other applications include over-the-air diagnostics/repairs and over-the-air software downloads, e.g., executable code transfers. Another example of an application of the expert system transmitting data relates to over-the-air diagnostics of a digital telephone. If the complex administrative data, received from step 50, contains information relating to problems, for example a programming error, incomplete software on the telephone, the wrong version of software, etc., with a particular telephone, the expert system will handle this information as a recognized activity in step 65. The expert system processes the recognized activity, which was recorded in step 70, in step 75, then proceeds to step 80 to trigger a search and retrieval of the data, which could be software in the form of executable code, necessary to resolve the problem with the particular telephone. A two-way data link, as described above, is initiated in step 85. The expert system's rules could also notify a technician to call the subscriber at the same time the two-way data link is established so that the technician may talk with the customer through the resolution of the problem with the particular telephone. The expert system then triggers the OTA server, in step 90, to download the proper programming data onto the particular telephone. After a signal is received from the telephone that the data was successfully downloaded, processing is terminated at step 95.

Figure 3:
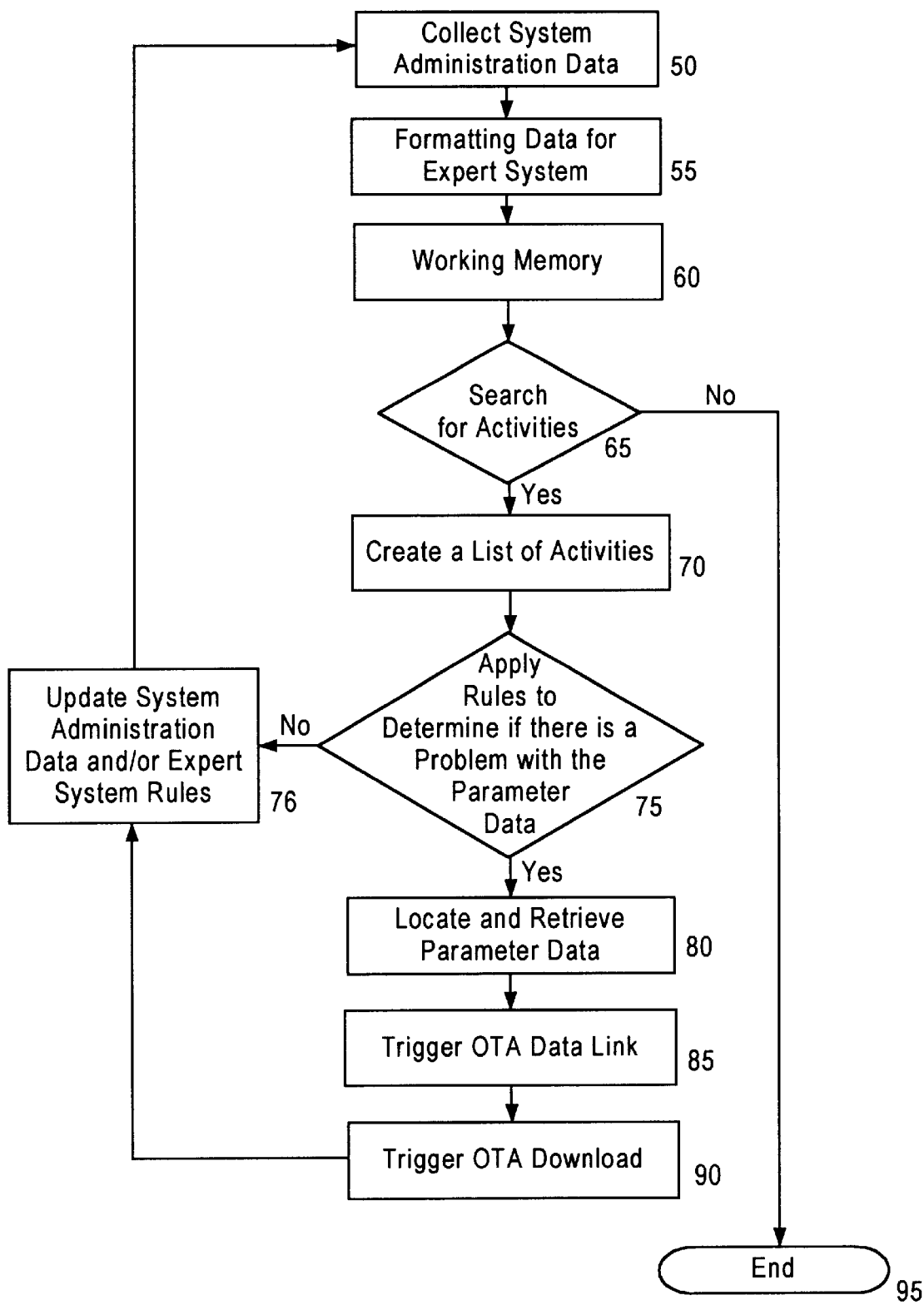
FIG. 3 is a flow diagram depicting another embodiment of processing performed by an expert system useful in explaining the interaction of an expert system and a wireless digital communications network with OTA functionality in accord with the present invention.

Another embodiment of an expert system is diagrammed in FIG. 3. The expert system shown in FIG. 3 operates substantially the same as the expert system shown in FIG. 2, but includes the ability to update network administration data and/or the rules used by the expert system.

When the expert system of FIG. 3 applies the rules to recognized activities in step 75, a no determination, indicating that there is not a problem with a subscriber's digital telephone's parameter data that relates to characteristics of a digital telephone, and that there is no need for new and/or updated parameter data, causes the expert system to update the network administration data and/or the expert system's rules. Such an update might be made, for example, if an expert system was keeping track of how many times a subscriber roams into new areas and uses that information to trigger a download of parameter data that relates to characteristics of a digital telephone to the subscriber's digital telephone. Suppose an expert system's rules dictated that the expert system download a new SID to a subscriber's digital telephone if a subscriber uses their digital telephone three times in a new area. Suppose also that a subscriber uses her digital telephone in a new area for the second time. In this case the expert system would not trigger a download of parameter data that relates to characteristics of a digital telephone to the subscriber's digital telephone, but would update the network administration data to reflect that she has used her digital telephone in the new area two times. The next time that subscriber uses her digital telephone in that new area the expert system will download into her digital telephone's preferred roaming list parameter data indicating the SID of the preferred provider for that area.

After a two-way data link has been established, the expert system shown in FIG. 3, triggers the OTA server, in step 90, to download the proper parameter data that relates to characteristics of a digital telephone onto the subscriber's digital telephone. The expert system waits to receive a signal from the digital telephone that the parameter data that relates to characteristics of a digital telephone was successfully downloaded, then updates the network administration data accordingly, step 76. If the digital telephone does not send a signal that the parameter data that relates to characteristics of a digital telephone was successfully downloaded, the expert system updates the network administration data accordingly and attempts to make the download at a later time.

An application of the present invention is now illustrated by way of example and reference to FIG. 1. In order for a carrier to offer subscribers one rate for all calls, whether originating within the carrier's network or outside the carrier's network, two things are necessary. First, the carrier must arrange with other wireless digital communication service providers for reduced rates when the carrier's subscribers are out of the area covered by the carrier's network. Second, the carrier must include preferred roaming lists in its subscribers' digital cellular telephones. PRLs contain a list of system identifications (SIDs) for each digital communication service provider (preferred provider) with which the carrier has arrangements.

A subscriber's digital telephone 5 will constantly make contact with other digital communication service provider's equipment while the subscriber is outside of the carrier's network. From the other digital communication service providers' equipment, information about the subscriber's location is sent to the carrier's home location register 15. This is done so the carrier's network knows where the subscriber is in case a call is sent to the subscriber's digital telephone 5. Alternatively, a subscriber may make a call while outside the carrier's network. In this case the other digital communication service provider will handle the call through its network, and will send information, including the subscriber's location, back to the carrier's network. Also, the other provider sends usage information to the carrier's billing system, for example residing in the customer service center 17. Either way, the carrier's network collects network administration data relating to the roaming habits of the subscriber.

The expert system 31 constantly searches the compiled network administration data for recognized activities and decides what action to take for each digital telephone 5 based upon application of the expert system's rules to the recognized activities. In the case of updating a PRL, the expert system 31 receives the collected network administration data and searches for recognized activities, i.e., indications that a subscriber is roaming outside the area covered by the carrier's network. The expert system 31 then applies the rules pertaining to PRLs.

For example, suppose a subscriber often roams through two areas outside of the carrier's network, but does not make or receive any calls. Three digital communication service providers, Alpha, Bravo, and Charlie serve area one. Area two is also served by three digital communication service providers, Delta, Echo, and Foxtrot. The expert system 31 recognizes that the subscriber is often in these two areas, but has no calls to or from her digital telephone 5. Depending upon what the rules dictate, the expert system makes decisions and initiates appropriate programming actions.

Suppose that the carrier has current contracts with Bravo and Delta, making them preferred providers, but no contract with Alpha, Echo, or Foxtrot, and an expired contract with Charlie. Suppose also that the subscriber's digital telephone's PRL contains a total of 15 SIDs and shows that Charlie is the preferred provider for area one, and that Delta is the preferred provider for area two. The rules, for example, may dictate that if a subscriber is in an area a certain number of times within a prescribed time period; and the subscriber's digital telephone's PRL does not contain the SID of the preferred service provider with whom the carrier has a current contract; then regardless of whether any calls are made to or from the subscriber's digital cellular telephone the expert system is to automatically update the subscriber's digital telephone's PRL. Assume that the subscriber roams into areas one and two frequently and within the time period specified by the expert system's rules.

The expert system 31, searching through the complex network administration data, recognizes that there is a problem with the subscriber's digital telephone's parameter data that relates to characteristics of a digital telephone, here an out of date PRL. The expert system 31 first retrieves a category of parameter data that relates to characteristics of a digital telephone, in this case PRL data, and searches through that data to find the parameter data that relates to characteristics of a digital telephone necessary to resolve the problem with the subscriber's digital telephone's PRL. In the present example, this means that the expert system 31 retrieves only the parameter data that relates to characteristics of a digital telephone reflecting the current contract with Bravo. The expert system 31 then triggers the OTA Application Server 25 to initiate a two-way data link over-the-air with the subscriber's digital telephone 5. The expert system 31 then triggers the OTA Application Server 25 to download only the parameter data that relates to characteristics of a digital telephone relating to the Bravo SID onto the subscriber's digital telephone 5, thereby overwriting only the old parameter data that relates to characteristics of a digital telephone relating to the Charlie SID. As such, the download solution provides only the data actually needed by the particular digital telephone.

In a similar manner, the expert system may recognize and respond to a need to download executable software, for example to debug software used to select systems based on processing of received SIDs and the PRL data.

There are fewer errors resulting from use of the present invention because the network is automatically applying the same rules to all network administration data. The present invention is efficient because the network identifies only a particular digital telephone that needs to be updated, and then sends only the particular data needed by an individual digital telephone; resulting in less data being sent to fewer digital cellular telephones, using fewer network resources, and taking less time to download data.

The above is merely an example designed to illustrate the present invention and is not meant to limit the scope of the present invention. Those of ordinary skill in the art will recognize additional objects, advantages and novel features of the invention from the above description and from practicing the invention.

What is claimed is:

1. A method for intelligently managing a subscriber base of programmable mobile digital devices for a wireless, digital communications network, comprising the steps of:
   compiling in a processing node within the network, network administration data related to wireless communication services provided to the mobile, digital devices served by the wireless, digital communications network;
   processing at least a portion of the compiled network administration data through an expert system to determine whether a programming action needs to be taken with respect to an individual mobile, digital device;
   retrieving programming data if the expert system determines that the programming action is needed with respect to the individual mobile, digital device;
   establishing an over-the-air data link through the digital communications network to the individual mobile, digital device;
   transmitting the retrieved programming data via the over-the-air data link to the individual mobile, digital device; and
   storing the transmitted programming data in memory on the individual mobile, digital device for future use by the mobile, digital device.

2. The method of claim 1, wherein:
   network administration data related to wireless communication services provided to the mobile, digital devices comprises a plurality of network administration data related to wireless communication services provided to the mobile, digital devices; and
   a processing node within the network comprises a plurality of processing nodes within the network.

3. The method of claim 1, further comprising the steps of:
   filtering the network administration data related to wireless communication services provided to the mobile, digital devices to remove irrelevant data after the network administration data related to wireless communication services provided to the mobile, digital devices has been received; and
   applying relevant network administration data related to wireless communication services provided to the mobile, digital devices for processing through the expert system.

4. The method of claim 3, further comprising the steps of:
   creating a log of the relevant network administration data related to wireless communication services provided to the mobile, digital devices for processing through the expert system; and
   using the log to sequentially supply relevant network administration data related to wireless communication services provided to the mobile, digital devices for only one mobile, digital device at a time to the expert system for processing.

5. The method of claim 1, wherein:
   retrieved programming data comprises parameter data relating to characteristics of a mobile, digital device from the wireless digital communications network to the individual, mobile, digital device.

6. The method of claim 1, wherein:
   the retrieved programming data comprises executable software for controlling the operation of a mobile, digital device through the digital communications network.

7. The method of claim 1, wherein:
   the individual mobile, digital device comprises a digital cellular telephone.

8. The method of claim 1, wherein:
   at least a portion of the network administration data related to wireless communication services provided to the mobile, digital devices is received from an individual, mobile digital device.

9. The method of claim 1, wherein:
   at least a portion of the network administration data related to wireless communication services provided to the mobile, digital devices is received from a processing node of the wireless, digital communications network.

10. The method of claim 9, wherein:
    the processing node is a network node selected from the group consisting of a mobile switching center, a home location register, a billing system, a mobile terminal authorizing system, and a network provisioning system.

11. The method of claim 8, wherein:
    at least another portion of the network administration data related to wireless communication services provided to the mobile, digital devices is received from a processing node of the wireless, digital communications network.

12. The method of claim 1, further comprising the step of:
    formatting the network administration data related to wireless communication services provided to the mobile, digital devices to the input requirements of the expert system before processing the network administration data related to wireless communication services provided to the mobile, digital devices through the expert system.

13. The method of claim 1, wherein processing the network administration data related to wireless communication services provided to the mobile, digital devices by the expert system further comprises the steps of:
    recognizing predetermined activities contained within the network administration data related to wireless communication services provided to the mobile, digital devices;
    recording recognized activities;
    logically applying predetermined rules to each activity to determine whether programming data should be downloaded to an individual mobile, digital device; and
    deciding, based upon predetermined rules, when to download programming data to an individual mobile, digital device.

14. The method of claim 1, wherein the step of retrieving programming data from the digital communications network comprises the steps of:
- querying processing nodes within the network for categories of data;
- selecting a category of data;
- sorting through the selected category of data for specific programming data; and
- sending the specific programming data to the expert system.

15. The method of claim 1, wherein compiling network administration data related to wireless communication services provided to the mobile, digital devices further comprises:
- compiling data that is ready for downloading to an individual mobile, digital device; and
- the step of transmitting the retrieved data over-the-air data link to the individual, mobile, digital device further comprises transmitting the data that is ready for downloading to an individual mobile, digital device.

16. A method for intelligently managing a subscriber base of programmable mobile digital devices for a wireless, digital communications network, comprising the steps of:
- compiling in a processing node within the network, network administration data related to wireless communication services provided to the mobile, digital devices served by the wireless, digital communications network;
- processing at least a portion of the network administration data related to wireless communication services provided to the mobile, digital devices through an expert system to determine whether an individual mobile, digital device should receive a download of programming data that relates to the individual mobile, digital device;
- selecting, by the expert system, a data category from among a plurality of data categories contained in processing nodes within the wireless, digital communications network if programming data that relates to a mobile, digital device should be downloaded to the individual mobile, digital device;
- searching the selected data category by the expert system to identify specific programming data that relates to the individual mobile, digital device for the download to the individual mobile, digital device;
- establishing an over-the-air link through the wireless digital communications network to the individual mobile, digital device;
- downloading the specific programming data that relates to the individual mobile, digital device to the individual, mobile, digital device via the over-the-air data link; and
- storing the downloaded programming data that relates to the individual mobile, digital device in memory on the individual mobile, digital device for future use by the individual mobile, digital device.

17. The method of claim 16, further comprising the steps of:
- filtering the network administration data related to wireless communication services provided to the mobile, digital devices to remove irrelevant data after the network administration data related to wireless communication services provided to the mobile, digital devices has been received;
- supplying relevant network administration data related to wireless communication services provided to the mobile, digital devices for processing through the expert system; and
- formatting the network administration data related to wireless communication services provided to the mobile, digital devices to the input requirements of the expert system.

18. The method of claim 16, wherein processing the network administration data related to wireless communication services provided to the mobile, digital devices by the expert system further comprises the steps of:
- recognizing predetermined activities contained within the network administration data related to wireless communication services provided to the mobile, digital devices;
- recording recognized activities;
- logically applying predetermined rules to each activity to determine whether programming data that relates to a mobile, digital device should be downloaded to an individual mobile, digital device; and
- deciding, based upon predetermined rules, when to download programming data that relates to a mobile, digital device to an individual mobile, digital device.

19. The method of claim 16, wherein:
the individual mobile, digital device comprises a digital cellular telephone.

20. The method of claim 16, wherein:
at least a portion of the network administration data related to wireless communication services provided to the mobile, digital devices is received from an individual, mobile digital device.

21. The method of claim 16, wherein:
at least a portion of the network administration data related to wireless communication services provided to the mobile, digital devices is received from at least a processing node of the wireless, digital communications network.

22. The method of claim 20 wherein:
at least another portion of the network administration data related to wireless communication services provided to the mobile, digital devices is received from at least a processing node of the wireless, digital communications network.

23. The method of claim 16, wherein compiling network administration data related to wireless communication services provided to the mobile, digital devices further comprises:
- compiling data that is ready for downloading to an individual mobile, digital device; and
- the step of transmitting the retrieved data over-the-air data link to the individual, mobile, digital device further comprises transmitting the data that is ready for downloading to an individual mobile, digital device.

24. A method for intelligently managing a subscriber base of programmable mobile digital devices for a wireless, digital communications network, comprising the steps of:
- compiling in a processing node within the network, network administration data related to wireless communication services provided to the mobile, digital devices served by the wireless, digital communications network;
- developing a set of rules for analyzing the network administration data related to wireless communication services provided to the mobile, digital devices to determine whether programming data should be changed;

logically applying the rules to at least a portion of the collected network administration data related to wireless communication services provided to the mobile, digital devices to determine whether an individual mobile, digital device should have its programming data changed;

identifying specific programming data from a plurality of programming data, if an individual mobile, digital device should have its programming data changed;

initiating a download of programming data from the wireless, digital communications system to the individual mobile, digital device to download the specific programming data onto the individual mobile, digital device.

25. The method of claim 24 wherein:

programming data comprises parameter data that relates to characteristics of a mobile, digital device.

26. The method of claim 25 wherein:

parameter data that relates to characteristics of a mobile, digital device comprises data related to a preferred roaming list.

27. The method of claim 24, wherein:

the data download from the wireless, digital communications network is conducted over-the-air.

28. A system for use with a wireless, digital communications network comprising:

a system for compiling in a processing node within the network, network administration data related to wireless communication services provided to the mobile, digital devices served by the wireless, digital communications network;

an expert system, communicating with the system for compiling, for analyzing at least a portion of the network administration data related to wireless communication services provided to the mobile, digital devices to recognize predetermined activities, and determine whether recognized activities indicate that an individual mobile, digital device requires data, and retrieves necessary programming data; and an over-the-air application system responsive to the expert system to download the retrieved programming data onto the mobile, digital device upon the expert system's command.

29. A wireless, digital communications network comprising:

a plurality of mobile, digital devices;

a plurality of base stations implementing a standard air-link interface for wireless communications with a plurality of mobile, digital devices;

a mobile switching center, in communication with the base stations for controlling the wireless communications to and from the of mobile, digital devices;

a home location register, accessible by the mobile switching center, for storing service profiles for each mobile, digital device;

interworking function equipment for providing data communication coupled to the mobile switching center and a data network;

an expert system communicating via the data network for receiving and analyzing network administration data related to wireless communication services provided to one or more of the mobile, digital devices to determine whether individual mobile, digital devices require programming data downloads;

an over-the-air application server communicating with the data network, and communicating with and controlled by the expert system through the data network, for establishing a data link with an individual mobile, digital device and transmitting programming data over an established data link to the individual mobile, digital device; and a source of a plurality of programming data for supplying the programming data to the expert system and to be transmitted via the over-the-air application server.

30. The wireless, digital communications network of claim 29, further comprising:

at least a customer service center, communicating with at least a home location register and with the over-the-air application server, that provides network administration data related to communication services for mobile, digital devices and concerning a plurality of mobile, digital devices.

31. The wireless, digital communications network of claim 29, wherein:

network administration data related to communication services for mobile, digital devices and regarding a plurality of mobile, digital devices is compiled in at least a processing node within the network.

32. The wireless, digital communications network of claim 29, further comprising:

a system, communicating with the data network, for compiling network administration data related to communication services for mobile, digital devices from at least a processing node within the network and regarding a plurality of mobile, digital devices served by the digital communications network.

33. The method of claim 4, wherein:

the individual mobile, digital device comprises a digital cellular telephone.

* * * * *